A. C. ARNOLD.
Improvement in Door-Hangers.
No. 129,777.                                Patented July 23, 1872.
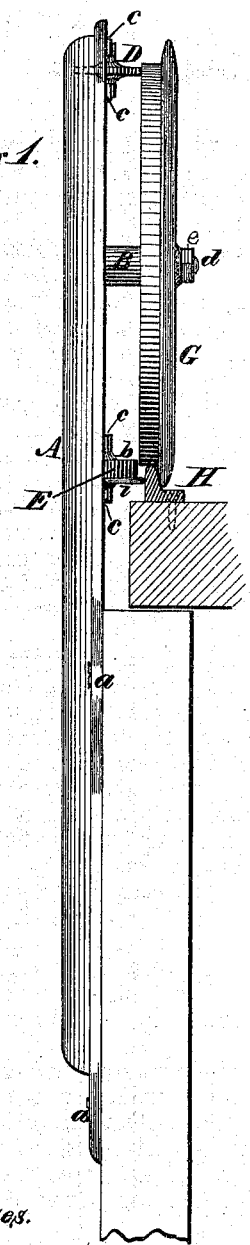
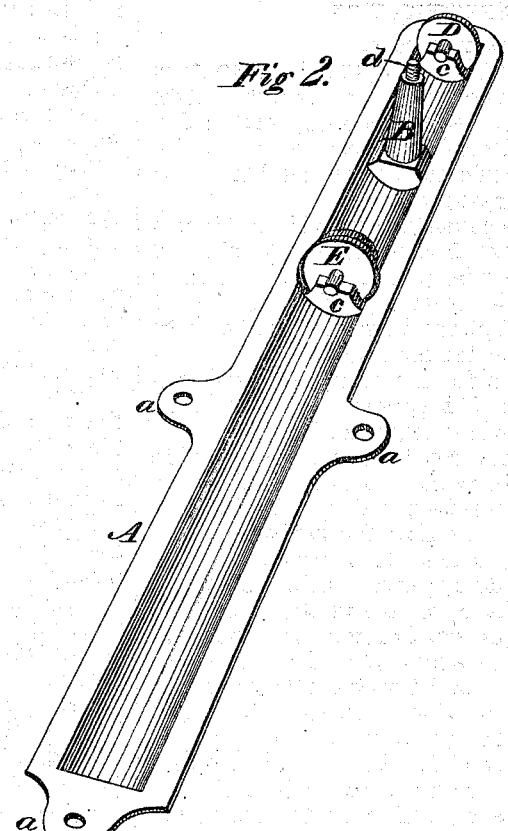
Witnesses.
Harry King.
H. H. Dodge.
Inventor.
A. C. Arnold
by Dodge & Son
Attys.

UNITED STATES PATENT OFFICE.

ALONZO C. ARNOLD, OF NORWALK, CONNECTICUT.

IMPROVEMENT IN DOOR-HANGERS.

Specification forming part of Letters Patent No. 129,777, dated July 23, 1872.

SPECIFICATION.

*To all whom it may concern:*

Be it known that I, ALONZO C. ARNOLD, of Norwalk, in the county of Fairfield and State of Connecticut, have invented certain Improvements in Door-Hangers, of which the following is a specification, reference being had to the accompanying drawing.

My invention consists in providing hangers with one or more friction-rollers to support and guide the wheel, and in making their bodies of a semicircular cross-section, in order to render them light and strong and give room for the rollers on the inside.

Figure 1 is a side view of my hanger in position, and Fig. 2 a perspective view of its body with the wheel removed.

In constructing my hanger I first provide the cast-iron body A, of a semicircular or a U-form in cross-section, with perforated ears $a$ on its edges to receive the screws or bolts for holding it in place. In the hollow side of the body, near its upper end, I form a conical journal or pintle, B, to receive the wheel, and the end of the journal I provide with a screw-neck, $d$, to receive a nut for holding the wheel in place. The neck $d$ I make on the end of a wrought-iron rod, which I insert in the mold before casting the body, so that the pintle is cast upon or around it. Each side of the journal or pintle I form a pair of studs, $c$, having notches or seats in their ends to receive the journals of the rollers. Having thus constructed the body, I next provide the two rollers D and E, having journals cast on their sides, and mount one between each pair of studs $c$, with their journals resting in the notched ends of the same, before mentioned. I then provide the wheel G and mount it on the journal B, so as to bear against the rollers and hold them in their seats, and to the screw-neck $d$ apply a nut, $e$, to hold the wheel on its journal, as shown in Fig. 1. The upper roller, bearing against the rear or outer side of the wheel, keeps it in a true vertical position, and prevents it leaning outward when the journal becomes worn, or from tipping back so as to break the journal off when subjected to severe strain. By thus holding the wheel in its upright position the hanger is caused to hold the door up close to its frame, so as to maintain a tight close joint around it. The lower roll E I provide with a flange, $i$, which extends out under the face of the wheel and bears against the outer side of the rail or track H, as shown in Fig. 1.

By this arrangement I am enabled to use a wheel having but a single flange to run on the inside of the rail, as shown, instead of the usual double flanged or grooved wheel, and thus to reduce the friction and overcome the liability of the wheel running off.

By making the body of the hollow semicircular form I render it very light and stiff, and give room for the rollers inside of it, so that it may be set up close to the wheel, in order to hold the door up snugly to its place.

In order to make the hanger more durable, the journal B, the bearings for the rollers, the roller-journals, and the eye of the wheel may all be "chilled," so as to prevent them from wearing away.

If desired, a grooved wheel may be used and the lower roller dispensed with; but such an arrangement is not deemed desirable.

In order to prevent the wheel from possibly running off when the lower roller is used, the track may be provided with a rib or flange along its outer side, and the flange of the roller E be arranged to engage under the rib so as to prevent the hanger from rising.

By constructing the hanger on my plan, with the hollow body, and providing it with the friction-rollers, located and arranged as described, I render it very light, strong, and durable, and at the same time very cheap.

Having described my invention, what I claim is—

1. The semi-cylindrical or concave strap or body A having the journal B and bearings $c$ cast therein, substantially as described.

2. In combination with the wheel or sheave G, the friction-roller D, arranged to bear against the wheel near its upper side, as set forth.

3. The wheel or sheave G and the friction-roller E secured to the strap or body A, and arranged to bear upon the rail, substantially as described.

ALONZO C. ARNOLD.

Witnesses:
JOSEPH F. FOOTE,
BYRON W. COHEN.